May 31, 1960  F. BOHLE ET AL  2,938,436
GEAR SHAVING
Original Filed Jan. 18, 1954  3 Sheets-Sheet 1
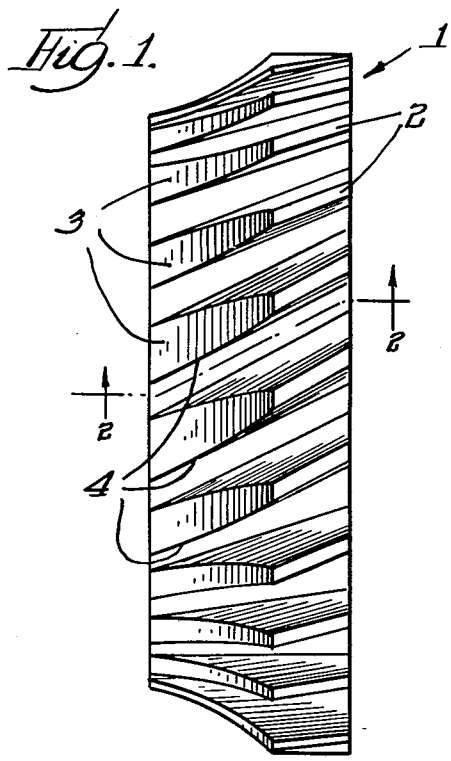
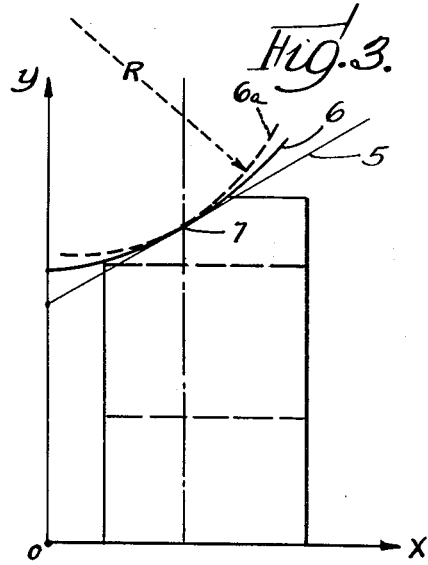
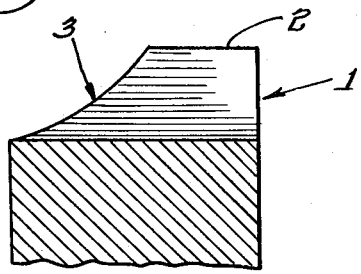
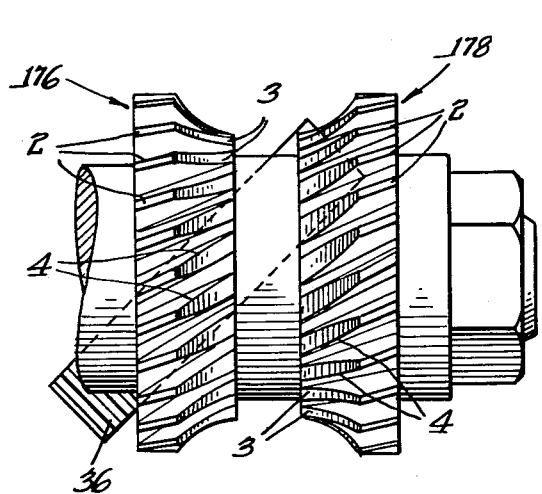
INVENTORS.
Fred Bohle
Oliver E. Saari
By: Olson & Trexler
attys

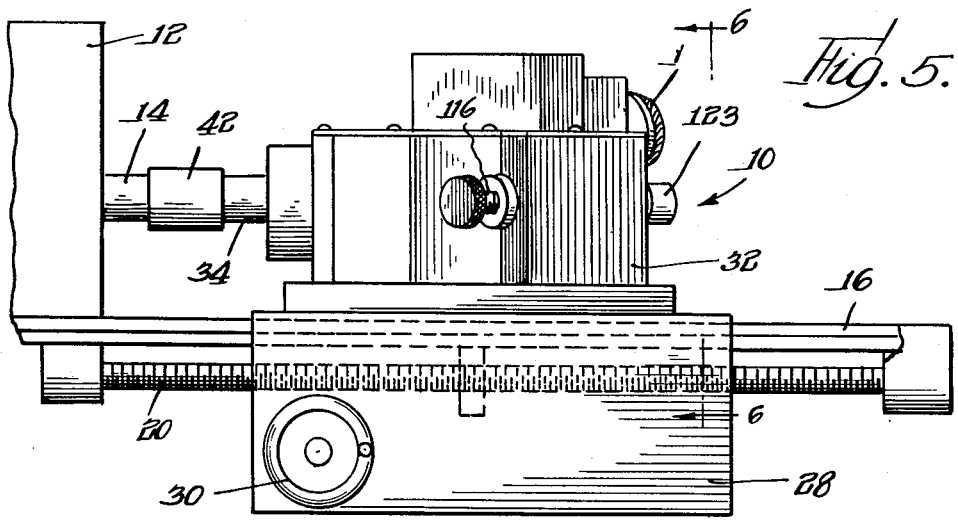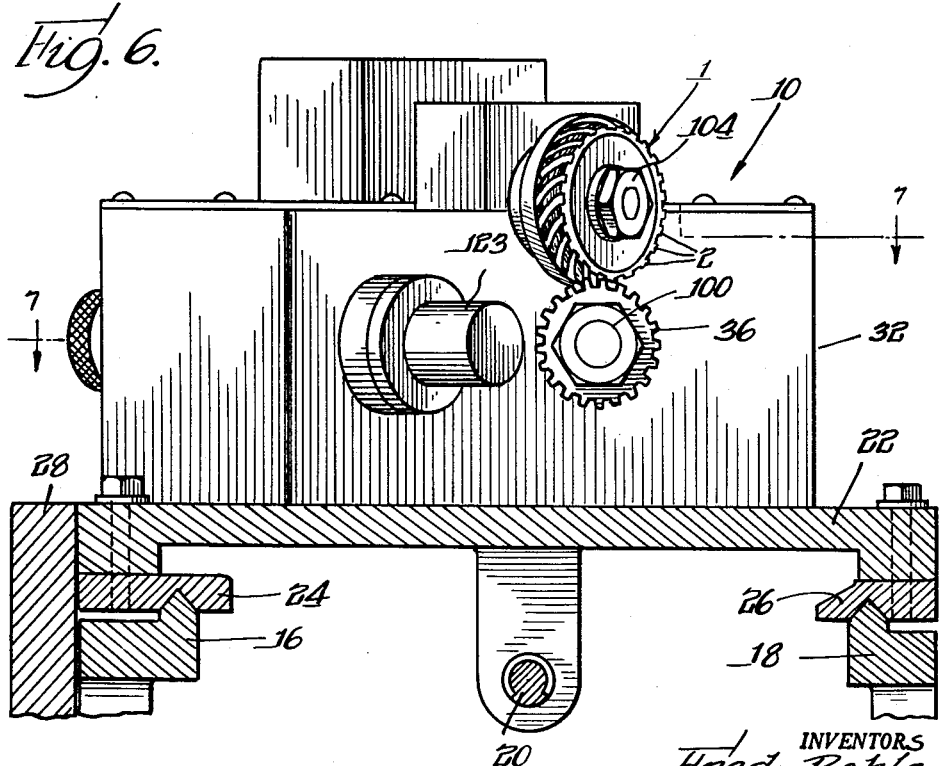

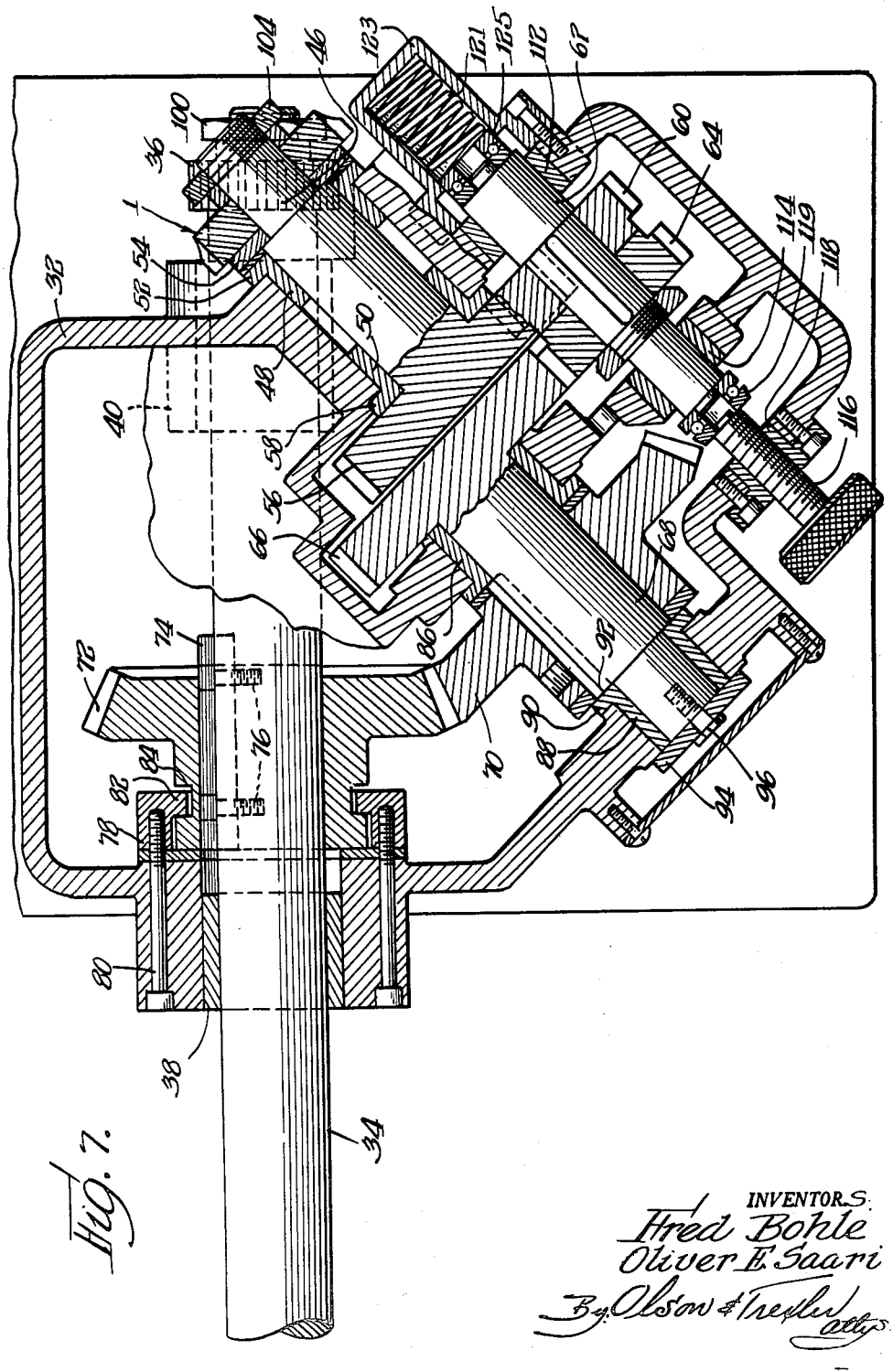

United States Patent Office 2,938,436
Patented May 31, 1960

2,938,436
GEAR SHAVING

Fred Bohle, Evanston, and Oliver E. Saari, Schiller Park, Ill., assignors to Illinois Tool Works, Chicago, Ill., a corporation of Illinois Original application Jan. 18, 1954, Ser. No. 404,657, now Patent No. 2,780,146, dated Feb. 5, 1957. Divided and this application Nov. 8, 1956, Ser. No. 621,068

5 Claims. (Cl. 90—1.6)

This invention relates to a gear shaving tool and a machine for shaving gears by means of it.

This application comprises a division of copending application, Serial No. 404,657, filed January 18, 1954, and entitled "Gear Shaving," Patent No. 2,780,146, February 5, 1957.

Gear shaving is ordinarily practiced on a machine in which the gear to be shaved and the shaving tool are mounted on skew shafts, that is to say, on shafts which are not parallel and do not intersect. The usual shaving tool has the form of a helical gear mating with the gear to be shaved. Transverse gashes providing cutting edges are formed in the teeth of the helical gear or tool, and the teeth of the tool are forced into the spaces between the teeth of the gear. One of the shafts is power-driven and the other is floating. As a result, the cutter shaves roughnesses off the gear teeth but its cutting edges do not always generate the surfaces desired on the gear teeth and, therefore, do not correct inaccuracies in these teeth which may have resulted from the hobbing operation by which the gear was made.

Accurate surfaces on gear teeth could be generated by a cutter having the general form of a helical gear if the cutter were provided with cutting edges extending along the lines of travel of the points of contact between its teeth and the gear teeth. We have discovered that a cutter in the form of a helical gear may be provided with such cutting edges by cutting off one end of its teeth by an appropriate surface of revolution about the axis of the gear. A cutting tool made in this way is easy to produce, and the sharpening of this tool is easy, as it requires merely rotating the tool about its axis and grinding the surface of revolution at the end of the teeth so as to sharpen all the cutting edges simultaneously with a single grinder.

In the new cutting tool made in this way, cutting edges of the desired form appear only at one side of each tooth of the tool. These cutting edges are acute and are well adapted to scrape one side of each tooth of a gear meshing with the tool, and in so doing to generate an accurate surface on one side of the gear teeth when the cutting tool and the gear are turned in timed relation.

Largely because of its action upon only one side of the gear teeth, the acute edges of the new scraper or shaving tool tend to urge the gear to turn in the direction in which it is being rotated by its shaft in the shaving operation. Since the pressure of the shaving edges on the unfinished gear teeth is necessarily irregular, the shaving operation is not satisfactory unless carried out in a machine which prevents irregular forward movement of the gear under the influence of the scraper or tool.

In accordance with the invention, such movement of the gear is prevented by applying the driving power directly to the shaft on which the gear is mounted and indirectly to the cutter shaft through the timing gearing connecting the two shafts. This results in making the stress on the connecting gearing caused by engagement between the cutting edges of the tool and the teeth of the gear in the same direction as the stress on this gearing caused by the power drive, so that the gears of the gearing are constantly held in driving contact and prevent irregular forward movement of the gear.

Accordingly, a gear shaving machine embodying the invention, whereby an improved method of shaving may be practiced, comprises a cutting tool in the form of a helical gear in which one end of the threads is cut by a surface of revolution, skew shafts for the tool and the gear to be shaved, timing gearing connecting the two shafts, and means for applying driving power directly to the shaft on which the gear is mounted.

The principal object of the invention is to provide a method of shaving involute gear teeth which will smooth the surfaces of involute gear teeth and at the same time generate accurate involute surfaces on the teeth, correcting any errors in hobbing.

Other objects and advantages will become apparent from the following description and the accompanying drawings, wherein:

Fig. 1 is an elevational view of a novel shaving tool contemplated by the present invention;

Fig. 2 is a fragmentary sectional view of the shaving tool taken substantially along the line 2—2 of Fig. 1;

Fig. 3 represents the system of coordinates which expresses the formula for the hyperbola defining the surface of revolution containing the shaving edge of the tool;

Fig. 4 is an elevational view disclosing a rotary shaving tool structure comprising a pair of cutter members mounted upon the same cutter supporting arbor;

Fig. 5 is a side elevational view of gear tooth shaving apparatus embodying the principles and structural features of the present invention;

Fig. 6 is an end elevational view of the apparatus shown in Fig. 5 and taken along line 6—6 of Fig. 5; and Fig. 7 is a horizontal cross-sectional view taken substantially along line 7—7 of Fig. 6.

It is well-known that when two involute gears operate on skew axes, one or both of the gears being of the spiral type with helicoidal teeth, the teeth of the two gears have a point contact; and, as the gears rotate, the contact point moves along a straight line called the path of contact which is fixed in space in a skew position relative to the axis of each gear. In spite of general knowledge of these facts, it appears not before to have been recognized that the line of travel of the point of contact on one of the gears may be determined by finding the intersection of the side surfaces of its teeth with the surface of revolution generated by the relative movement of the line of contact and the gear. Since the path of contact is in a skew position with respect to the gear axis, the surface of revolution which it will generate with respect to this gear is a hyperboloid of revolution. The formula for the hyperbola defining this surface can be expressed in the system of coordinates shown in Fig. 3. The $x$ axis is positioned along the axis of the gear and the $y$ axis is in the transverse plane containing the point at which the path of contact is tangent to the base cylinder of the gear. In these coordinates, the formula for the hyperbola is:

$$x = \tan a \, y^2 - r^2$$

where $a$ is the base helix angle of the gear as defined in conventional involute gear geometry, and $r$ is the base radius of the gear.

Fig. 1 is a side elevational view of a shaving tool designated generally by the numeral 1, which comprises a plurality of helical involute teeth 2, the left extremities of which have been cut away so as to provide hyperbolic surfaces 3. By cutting away or relieving in this manner one extremity of each of the teeth 2, shaving edges 4 are presented. These shaving or cutting edges 4 will pass through every point of contact with the flanks of the teeth of a complementary gear member.

As previously pointed out, the line of travel of the point of contact may be determined by finding the intersection of the side surfaces of the teeth 2 with the surface of revolution 3 generated by the relative movement of the line of contact and a complementary gear. In Fig. 3 the straight line 5 is a projection of the path of contact. This path of the points of contact remains fixed as the shaving cutter rotates, and therefore sweeps out a surface of revolution which in the present instance is a hyperboloid of revolution as defined by the surface 3. The shaving or cutting edges 4 formed by the intersection of the hyperboloid with the involute helicoidal tooth form have the desired property of passing through every point of the path of contact because the hyperboloid is the locus of all positions the contact can have relative to complementary gear teeth. In Fig. 3 the hyperboloid is indicated by the line 6, and the pitch point, namely the point at which the line 5 is tangent to the line 6, is indicated by the numeral 7. It should also be understood that each hyperboloidal surface 3 is at right angles to the adjacent tooth flank at every point along the cutting edge 4. However, the cutting edge 4, when considered in a transverse section taken normal to the cutter axis, is acute and therefore facilitates the shaving or scraping action of the edge 4 upon the flank of a complementary gear tooth.

In order for a clear understanding of the functioning of a shaving tool as contemplated by the present invention, it will now be described as a part of a shaving machine designated generally by the numeral 10, see Figs. 5, 6 and 7. The machine 10 forms an attachment or fixture which is adapted to be mounted on any standard lathe or the like having a variable speed power drive 12, a driving shaft 14, a pair of spaced guideways or tracks 16 and 18, and a feed screw 20.

The fixture 10 includes a base or carriage plate 22 having slides 24 and 26 bolted or otherwise secured thereto and slidably mounted upon the tracks 16 and 18. A plate member 28 depends from the carriage plate 22 for rotatably mounting a hand wheel 30, which wheel is interconnected by any conventional means, not shown, with the feed screw so that upon rotation of the wheel, the carriage is traversed along the tracks 16 and 18.

A housing 32 is rigidly mounted on the carriage plate 22 for supporting and enclosing work and cutter mounting arbors or mandrels and suitable gearing transmission therefor. As shown best in Fig. 7, a mandrel 34 for supporting a work piece, such as gear 36, is rotatably journaled in bearings 38 and 40 on the housing 32. The mandrel 34 is connected to the drive shaft 14, Fig. 5, by a suitable coupling 42. The bearings 38 and 40 support and maintain accuracy of alignment of the mandrel 34, and are slidable longitudinally of the mandrel 34 as an incident to the shifting of the housing 32 along the guideways 16–18. This shifting of the housing 32 enables the shaving tool 1 to be fed across the periphery of the rotating work or gear member 36 in a manner about to be described.

The shaving tool 1 is mounted on an arbor 46 which is disposed at a skew angle to the axis of the work piece supporting mandrel 34. The arbor 46 is journaled in the housing 32 by suitable bearings 48 and 50. The bearing 48 includes an annular thrust receiving portion 52 which is adapted to cooperate with a thrust bearing member 54 mounted on the arbor. The arbor 46 is driven by means of a gear chain or change gear transmission which includes a helical gear 56 rigidly secured to the inner end of the arbor. The gear 56 cooperates with a thrust receiving portion 58 of the bearing 50, to secure the arbor 46 and associated parts against longitudinal displacement relative to the housing 32.

The gear train for driving the shaving tool supporting arbor 46 also includes a helical pinion 60 keyed upon a shaft 62 and this pinion meshes with and drives the gear 56. The shaft 62 is driven by a helical gear 64 keyed thereto, which gear is in turn driven by a gear 66 keyed to a shaft 68. The shaft 68 has a bevel gear 70 fixed thereto, which meshes with and is driven by a complementary bevel gear 72 keyed to the work or gear driving mandrel 34. From the foregoing it will be apparent that the gear member 36 has a backlash free coupling with the drive mandrel 34 and that the rotary shaving tool is driven through a gear transmission from said mandrel.

Referring now to Fig. 7, it will be seen that the bevel gear 72 is mounted on the mandrel 34 for sliding movement longitudinally of the mandrel by means of a key 74 secured to the mandrel by screws 76. The key 74 thus provides a driving connection between the mandrel 34 and the gear 72 while permitting the gear to move longitudinally of the mandrel along with the housing 32 during a feeding movement of the shaving tool 1. The gear 72 is retained against longitudinal movement relative to the housing 32 by means of a bearing member 78 fixed to the housing by screws 80 and having an inwardly extending annular thrust bearing portion or flange 82 which projects into an annular groove 84 in the body of the gear.

The shaft 68 is journaled in suitable bearings 86 and 88 mounted in the housing 32. The bearing 88 has an annular thrust receiving portion 90 engageable with a shoulder 92 on the shaft 68 for preventing longitudinal movement of the shaft in one direction. The shaft is restrained against movement in the opposite direction by means of a thrust plate 94 secured thereto by means of a screw 96.

It should be noted that the gear 36 is rigidly retained against rotation relative to the mandrel 34 by a suitable locking key, not shown, and nut means 100, and the shaving tool 1 is likewise rigidly secured to the arbor 46 by a suitable key, not shown, and nut means 104. The rotary tool 1 is synchronized with and driven at a predetermined speed ratio with respect to the speed of rotation of the work or gear member 36.

As previously set forth, each cutting edge 4 conforms generally to a path of point contact which the advancing side of each tooth element 2 will make with the finished gear 36. This arrangement of the shaving or cutting edges insures good cutting action, permitting relatively high speed, accurate shaving. In addition, this arrangement of the shaving edges enables the mandrel 34 and the arbor 46 to be disposed at a relatively large skew angle so that the sliding action between the tool and the work or gear member is increased. Preferably, the angle between the axes of the tool and the work is between 15° and 60° in order to obtain the desired shaving speeds.

As set forth above, the gear member 36 and the shaving tool 1 are both positively driven in synchronism with each other. It is common to prepare gear teeth for subsequent shaving or finishing by a roughing hobbing process. This consists in roughing out the teeth in the gear blank so that the teeth will be sufficiently oversize to permit subsequent finishing or shaving thereof. Inaccuracies or repetitive errors in the roughing hob such, for example, as errors in helical alignment of the hob teeth, may result in corresponding inaccuracies in the roughed out gear teeth. It is very important that such inaccuracies be eliminated in the completed gear. To accomplish this, the present invention contemplates the elimination of backlash in the gear and tool driving mechanism. By employing a backlash free coupling between the rotary gear support and the source of rotary power supply, such as the driving mandrel or shaft 34, and by coupling this drive shaft 34 with the shaving cutter 1 through the gear transmission as disclosed, the teeth 2 and shaving edges 4 of the tool coact with the complementary flanks of the teeth in the gear 36 so as to generate desired smooth and accurate gear teeth contours. In other words, the direct coupling of the gear with the source of rotary power, together with the cutting or shaving force of the edges 4 acting against the gear teeth as though these edges were driving the gear, completely eliminates backlash which might otherwise result. In shaving processes heretofore employed when a shaving cutter was driven against a freely rotatable gear member, errors resulting from backlash difficulties were experienced. By eliminating backlash as just described, errors in the gear teeth which may have been introduced during the previous forming or hobbing operation are corrected during the shaving operation.

To adjust the depth of the cut made by cutting edges 4 into the flanks of the gear teeth, it is merely necessary to rotate the tool 1 a slight amount relative to the gear member. Such rotative adjustment of the tool 1 is accomplished by the structure shown in Fig. 7. The shaft 62 carrying the helical gears 60 and 64 is not only rotatably supported by bearings 112 and 114, but is also axially adjustable in said bearings. An adjusting screw 116 is threaded into a suitable nut-like member 118 mounted on the housing 32, and the inner extremity of the shaft 62 bears against a ball-type thrust bearing 119. The shaft 62 is continuously biased against the adjusting screw 116 by a compression spring 121 disposed within a cup-shaped closure member 123 secured to the housing. Preferably, the spring 121 acts upon the shaft 62 through a ball-type thrust bearing 125. It will be apparent that upon rotation of the adjusting screw 116, the shaft 62 may be adjusted axially in opposite directions. Upon such axial adjustment of the shaft 62, the helical gears, 56, 60, 64 and 66 will experience slight rotation. Variation in the degree of rotation imparted to the tool in response to a given axial adjustment of the shaft 62 may be obtained by employing change gears of different helix angles. In the disclosed embodiment the helix angle of the gear 56 is about 15° while the helix angle of the gear 66 is about 25°. By properly coordinating the helix angles of the gears 56 and 66 and the lead of the screw threads on the adjusting screw 116, accurate, fine adjustments of the depth of the cut may be obtained.

The method of finishing gears with the above described apparatus is as follows. The work or gear member 36 and the cutting tool 1 are secured to their respective mandrels, and the cutting tool 1 is adjusted by means of the thumb screw 116 to provide the desired depth of cut. The power source 12 is then energized so that the cutting tool and the work piece are driven in the manner described above. The housing 32 carrying the shaving tool is then fed axially of the mandrel 34 by means of the hand wheel 30. As the tool 1 moves across the work piece, one flank of each of the work piece teeth is accurately finished regardless of any inaccuracies which may have been present in the initial rough forming operation. The particular shape of the shaving edges 4 of the tool 1 and the relatively large angular relationship between the axes of the tool and the gear member enable improved, high speed shaving action so that the tool may be fed relatively rapidly across the work periphery without danger of producing undesirable scallops in the flanks on one side of the gear teeth. In order to finish the opposite flanks on the opposite side of the gear teeth, the gear member is removed and then remounted on the mandrel in reverse position, whereupon the above described operation is repeated. Thus shaving of one side of the teeth is performed independently of the shaving of the opposite side.

The method of this invention can be carried out by a double shaving tool as illustrated at 176 and 178 in Fig. 4, wherein the two shaving members 176 and 178 are mounted on an axially shiftable arbor. Upon rotation of the arbor in one direction, the shaving edges of the member 176 finish the flanks on one side of the teeth of the gear 36. Subsequently, the arbor is shifted axially and rotated in the opposite direction, and the shaving edges of the member 178 finish the flanks on the opposite side of the teeth. Since the shaving members 176 and 178 are axially spaced from each other, neither of them interferes with or engages the work when the other is being used. As will be understood, the shaving members and the gear being finished are adjustable relatively toward and away from each other transversely of their axes for finishing gears of different sizes.

Preferably the shaver or shavers are capable of selective positioning on either side of the work, i.e. in front of the work as in Figs. 4 and 7, or behind the work. Such selective positioning allows for a choice of helix angles in the shaving members which is most suitable for a gear member with helical teeth. It will be apparent that for any given gear there is thus a choice of one of two possible helix angles for the shaving member, thereby affording the best cut or shaving action.

The shaving action according to the method described herein is at high speeds. Therefore, the cutter or shaving tool preferably is of carbide, or is provided with carbide inserts, carbide inserts in general being known in the art. This is possible since the cutting or shaving tool is readily ground on a form grinder.

It will be apparent from the foregoing description that the present invention contemplates a simple and improved method whereby flanks of teeth such as gear teeth, involute splines and the like, may be finished or shaved with great accuracy and with increased speed. By driving shaving edges of a rotating shaving tool against the flanks on one side of the teeth of the rotatably supported gear member, and rotatably driving the gear member in timed relation with the movement of the shaving edges and relatively shifting these edges and the gear teeth axially, predetermined smooth and accurate flank contours are generated. The flanks on the opposite sides of said gear teeth may be similarly generated by reversing the position of the work or tool on its respective support and applying the same shaving edges or by applying a series of other shaving edges without the necessity of reversing the position of the work or tool. Elimination of backlash difficulties represents another important contribution of the present invention. The invention also lends itself for shaving gear members of varying sizes and shapes and insures economy in the cost of shaving tool design and maintenance.

Certain specific disclosures, both structural and schematic, have been disclosed herein for the purpose of indicating practical embodiments of the invention, and it will be understood that other modifications and changes may be made without departing from the spirit and scope of the appended claims.

We claim:

1. The method of finishing the flanks of gear teeth and the like which comprises the steps of driving peripheral circularly aligned shaving edges of a rotating shaving tool against the flanks on one side of the teeth of a rotatably supported gear member in skew axis relation therewith, said shaving edges lying along the lines of travel of the point of contact between the gear teeth and the teeth of a conjugate gear, rotatably driving the gear member in timed relation with the movement of said shaving edges and relatively shifting said shaving edges and gear teeth axially of the gear member so as to generate predetermined flank contours, and driving peripheral circularly aligned rotating shaving edges similarly against the opposite flanks of said gear teeth so as to generate complementary flank contours.

2. The method of finishing the flanks of gear teeth and the like which comprises the steps of driving peripheral circularly aligned shaving edges of a rotating shaving tool against the flanks on one side of the teeth of a rotatably supported gear member in skew axis relation thereto, said shaving edges lying along the lines of travel of the point of contact between the gear teeth and the teeth of a conjugate gear, rotatably driving the gear member in timed relation with the movement of said shaving edges and relatively shifting said shaving edges and gear teeth axially of the gear member so as to generate predetermined flank contours, and subsequently driving another series of peripheral circularly aligned rotating shaving edges similarly against the opposite flanks of said gear teeth so as to generate complementary flank contours.

3. The method of finishing the flanks of gear teeth and the like which comprises the steps of driving peripheral circularly aligned shaving edges of a rotating shaving tool against the flanks on one side of the teeth of a rotatably supported gear member in skew axis relation thereto, said shaving edges lying along the lines of travel of the point of contact between the gear teeth and the teeth of a conjugate gear, rotatably driving the gear member in timed relation with the movement of said shaving edges and relatively shifting said shaving edges and gear teeth axially of the gear member so as to generate predetermined flank contours, subsequently driving peripheral circularly aligned rotating shaving edges similarly against the opposite flanks of said gear teeth so as to generate complementary flank contours, and during the shaving operation, maintaining the shaving tool free from contact with the flanks of the gear teeth opposite from those which are being shaved.

4. The method of finishing the flanks of gear teeth and the like which comprises the step of driving peripheral, circularly aligned shaving edges of a rotating shaving tool in one direction of rotation against the flanks on one side of the teeth of a rotatably supported gear member in skew axis relation thereto while maintaining confronting circularly aligned shaving edges out of contact with the gear member, rotatably driving the gear member in timed relation with the movement of said shaving edges and relatively shifting said shaving edges and gear teeth axially of the gear member so as to generate predetermined flank contours, shifting axially of said shaving tool and reversely driving all of said shaving edges whereby said confronting shaving edges generate complementary flank contours on the opposite flanks of the gear teeth while the first mentioned shaving edges are maintained out of contact with the gear teeth.

5. The method of finishing the flanks of gear teeth and the like which comprises the steps of driving peripheral circularly aligned shaving edges of a rotating shaving tool against the flanks on one side of the teeth of a rotatably supported gear member in skew axis relation therewith, said shaving edges lying along the lines of travel of the point of contact between the gear teeth and the teeth of a conjugate gear, rotatably driving the gear member directly and the shaving tool indirectly from the gear member, in timed relation and relatively shifting said shaving edges and gear teeth axially of the gear member so as to generate predetermined flank contours, and subsequently driving peripheral circularly aligned rotating shaving edges similarly against the opposite flanks of said gear teeth so as to generate complementary flank contours.

References Cited in the file of this patent
UNITED STATES PATENTS

| | | |
|---|---|---|
| 2,147,864 | Thrun | Feb. 21, 1939 |
| 2,214,225 | Drummond | Sept. 10, 1940 |
| 2,232,408 | Shaw | Feb. 18, 1941 |
| 2,236,256 | Allard | Mar. 25, 1941 |
| 2,499,167 | Sanborn | Feb. 28, 1950 |
| 2,581,701 | Praeg | Jan. 8, 1952 |
| 2,660,929 | Praeg | Dec. 1, 1953 |
| 2,749,802 | Carlsen | June 12, 1956 |

FOREIGN PATENTS

| | | |
|---|---|---|
| 668,067 | Germany | Nov. 25, 1938 |